US011279826B2

(12) United States Patent
Yamashita et al.

(10) Patent No.: US 11,279,826 B2
(45) Date of Patent: Mar. 22, 2022

(54) RESIN COMPOSITION AND MOLDED ARTICLE

(71) Applicant: Mitsubishi Gas Chemical Company, Inc., Tokyo (JP)

(72) Inventors: Momoko Yamashita, Hiratsuka (JP); Takafumi Oda, Hiratsuka (JP); Hatsuki Oguro, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 17/255,929

(22) PCT Filed: Jun. 17, 2019

(86) PCT No.: PCT/JP2019/023820
§ 371 (c)(1),
(2) Date: Dec. 23, 2020

(87) PCT Pub. No.: WO2020/004096
PCT Pub. Date: Jan. 2, 2020

(65) Prior Publication Data
US 2021/0163740 A1 Jun. 3, 2021

(30) Foreign Application Priority Data
Jun. 27, 2018 (JP) .............................. JP2018-121881

(51) Int. Cl.
*C08L 77/06* (2006.01)

(52) U.S. Cl.
CPC ......... *C08L 77/06* (2013.01); *C08L 2205/025* (2013.01)

(58) Field of Classification Search
CPC ............................ C08L 77/06; C08L 2205/025
See application file for complete search history.

(56) References Cited

U.S. PATENT DOCUMENTS

| 5,989,453 | A | 11/1999 | Marcq et al. |
| 6,008,288 | A | 12/1999 | Dalla Torre |
| 6,277,911 | B1 * | 8/2001 | Torre ..................... C08G 69/26 524/538 |
| 2011/0244381 | A1 | 10/2011 | Suzuki et al. |
| 2012/0142810 | A1 | 6/2012 | Bühler et al. |
| 2020/0062901 | A1 * | 2/2020 | Yamanaka ........... C08G 69/265 |

FOREIGN PATENT DOCUMENTS

| JP | H05-125276 A | 5/1993 |
| JP | H05-320416 A | 12/1993 |
| JP | 2002-501963 A | 1/2002 |
| JP | 2008-144170 A | 6/2008 |
| JP | 2010-285553 A | 12/2010 |
| JP | 2012-117066 A | 6/2012 |
| JP | WO 2018/155171 A1 * | 8/2018 |
| WO | 99/38916 A1 | 8/1999 |
| WO | 2010/071118 A1 | 6/2010 |
| WO | 2018/155171 A1 | 8/2018 |

OTHER PUBLICATIONS

International Preliminary Report on Patentability and Written Opinion for PCT/JP2019/023820, dated Sep. 10, 2019, and English Translation submitted herewith (11 pages).
International Search Report for PCT/JP2019/023820, dated Sep. 10, 2019, and English Translation submitted herewith (5 pages).
Extended European Search Report issued in corresponding European Application No. 19826809.6 dated Aug. 5, 2021 (8 pages).

* cited by examiner

*Primary Examiner* — Ana L. Woodward
(74) *Attorney, Agent, or Firm* — Fitch, Even, Tabin & Flannery LLP

(57) ABSTRACT

There is provided a low-viscosity resin composition having high mechanical strength when formed into a molded article and having excellent fluidity, and a molded article formed from the resin composition. The resin composition includes a first polyamide resin and a second polyamide resin, the first polyamide resin being an amorphous polyamide resin in which 70 mol % or more of a structural unit derived from a diamine is a structural unit derived from isophorone diamine and a structural unit derived from dicarboxylic acid includes a structural unit derived from an α,ω-linear aliphatic dicarboxylic acid having from 8 to 14 carbon atoms and a structural unit derived from an aromatic dicarboxylic acid, the second polyamide resin being an amorphous polyamide resin in which at least one type of the structural unit is a structural unit including two or more alicyclic structures, and the mass ratio of the second polyamide resin to the sum of the first polyamide resin and the second polyamide resin being from 10 to 90% by mass.

20 Claims, No Drawings

RESIN COMPOSITION AND MOLDED ARTICLE

CROSS-REFERENCE TO RELATED APPLICATIONS

This application is a U.S. national phase application filed under 35 U.S.C. § 371 of International Application Number PCT/JP2019/023820, filed Jun. 17, 2019, designating the United States, which claims priority from Japanese Application Number 2018-121881, filed Jun. 27, 2018.

FIELD OF THE INVENTION

The present invention relates to a resin composition and a molded article. In particular, it relates to a resin composition using an amorphous polyamide resin.

BACKGROUND OF THE INVENTION

A polyamide resin was conventionally a crystalline resin, but in recent years, an amorphous polyamide resin has been examined due to its high transparency.

For example, Patent Document 1 discloses a heat-resistant polyamide resin comprising a diamine component comprising not less than 40 mol % of bis(aminomethyl)cyclohexane and a dicarboxylic acid component comprising not less than 50 mol % of isophthalic acid and/or terephthalic acid.

Furthermore, as the amorphous polyamide resin, Grilamid TR-55 available from EMS-CHEMIE as an amorphous polyamide resin comprising 4,4'-methylenebis(2-methylcyclohexane-1-amine) and isophthalic acid as the main raw materials, and Grilamid TR-90 available from EMS-CHEMIE as an amorphous polyamide resin comprising 4,4'-methylenebis(2-methylcyclohexane-1-amine) and dodecanedioic acid as the main raw materials are known.

CITATION LIST

Patent Literature

Patent Document 1: JP 2010-285553 A

SUMMARY OF INVENTION

An amorphous polyamide resin is advantageously used for its transparency, and widely used for wide variety of applications from industrial applications to applications having high design properties such as switch covers, lenses, and frames of glasses. However, the amorphous polyamide resin has no apparent melting point and tends to lack heat resistance. Furthermore, in order to improve heat resistance, it is conceivable to increase a glass transition temperature of the amorphous polyamide resin. However, the amorphous polyamide resin having a high glass transition temperature has high melt viscosity and needs to be molded at a high temperature. Several problems are known for use at a high temperature and in particular, gelation, degradation, and an increased outgas amount are issues of concern. On the other hand, in order to reduce the melt viscosity, a plasticizer or a low molecular weight body may be added. However, there are problems such as volatilization as an outgas during molding or a reduction in mechanical properties.

A problem to be solved by the present invention is to satisfy such a demand, and an object of the present invention is to provide a low-viscosity resin composition having excellent fluidity while maintaining the amorphous polyamide-specific transparency, and a molded article formed from the resin composition.

As a result of investigation to solve the above problem, the inventors of the present invention have found that blending a specific amorphous polyamide resin in a known amorphous polyamide resin can provide a low-viscosity resin composition with excellent fluidity while maintaining transparency. Specifically, the problem described above is solved by the following means <1>, and preferably by the following means <2> to <15>.

<1> A resin composition comprising a first polyamide resin and a second polyamide resin, the first polyamide resin being an amorphous polyamide resin comprising a structural unit derived from a diamine and a structural unit derived from a dicarboxylic acid, in which not less than 70 mol % of the structural unit derived from a diamine is a structural unit derived from isophorone diamine and the structural unit derived from a dicarboxylic acid includes a structural unit derived from an α,ω-linear aliphatic dicarboxylic acid having 8 to 14 carbon atoms and a structural unit derived from an aromatic dicarboxylic acid, the second polyamide resin being an amorphous polyamide resin in which at least one type of the structural unit constituting the second polyamide resin is a structural unit comprising two or more alicyclic structures, and the mass ratio of the second polyamide resin to the sum of the first polyamide resin and the second polyamide resin being from 10 to 90% by mass.

<2> The resin composition according to <1>, wherein, in the second polyamide resin, not less than 40 mol % of the total of the structural unit constituting the second polyamide resin is the structural unit comprising two or more alicyclic structures.

<3> The resin composition according to <2>, wherein, in the first polyamide resin, the structural unit derived from a dicarboxylic acid comprises from 30 to 80 mol % of the structural unit derived from an α,ω-linear aliphatic dicarboxylic acid having 8 to 14 carbon atoms and from 70 to 20 mol % of the structural unit derived from an aromatic dicarboxylic acid.

<4> The resin composition according to any one of <1> to <3>, wherein, in the first polyamide resin, the structural unit derived from an α,ω-linear aliphatic dicarboxylic acid having from 8 to 14 carbon atoms comprises at least one of a structural unit derived from sebacic acid and a structural unit derived from dodecanedioic acid.

<5> The resin composition according to any one of <1> to <4>, wherein, in the first polyamide resin, the structural unit derived from an aromatic dicarboxylic acid comprises at least one of a structural unit derived from 2,6-naphthalenedicarboxylic acid and a structural unit derived from isophthalic acid.

<6> The resin composition according to <1>, wherein, in the first polyamide resin, not less than 90 mol % of the structural unit derived from a diamine is a structural unit derived from isophorone diamine, the structural unit derived from a dicarboxylic acid comprises from 30 to 80 mol % of the structural unit derived from an α,ω-linear aliphatic dicarboxylic acid having from 8 to 14 carbon atoms and from 70 to 20 mol % of the structural unit derived from an aromatic dicarboxylic acid, the structural unit derived from an α,ω-linear aliphatic dicarboxylic acid having from 8 to 14 carbon atoms comprises at least one of a structural unit derived from sebacic acid and a structural unit derived from dodecanedioic acid, and the structural unit derived from an aromatic dicarboxylic acid comprises at least one of a structural unit derived from 2,6-naphthalenedicarboxylic acid and a structural unit derived from isophthalic acid.

<7> The resin composition according to any one of <1> to <6>, wherein the second polyamide resin is constituted of a structural unit derived from a diamine and a structural unit derived from a dicarboxylic acid, and not less than 50 mol % of the structural unit derived from a diamine is the structural unit comprising two or more alicyclic structures.

<8> The resin composition according to any one of <1> to <7>, wherein the second polyamide resin is constituted of a structural unit derived from a diamine and a structural unit derived from a dicarboxylic acid, and not less than 70 mol % of the structural unit derived from a diamine is the structural unit comprising two or more alicyclic structures.

<9> The resin composition according to <7> or <8>, wherein the second polyamide resin is constituted of a structural unit derived from a diamine and a structural unit derived from a dicarboxylic acid, and not less than 50 mol % of the structural unit derived from a dicarboxylic acid is a structural unit derived from an aromatic dicarboxylic acid.

<10> The resin composition according to any one of <7> to <9>, wherein the second polyamide resin is constituted of a structural unit derived from a diamine and a structural unit derived from a dicarboxylic acid, and not less than 50 mol % of the structural unit derived from a dicarboxylic acid is a structural unit derived from an α,ω-linear aliphatic dicarboxylic acid having from 6 to 20 carbon atoms.

<11> The resin composition according to any one of <1> to <10>, wherein the structural unit comprising two or more alicyclic structures included in the second polyamide resin is represented by Formula (1) below:

Formula (1)

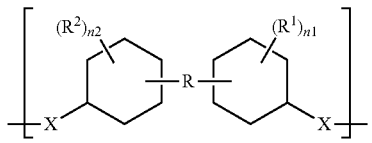

[Chem. 1]

wherein $R^1$ and $R^2$ each independently represent a hydrogen atom, or an alkyl group having from 1 to 4 carbon atoms, R is a single bond or a divalent linking group, Xs each are independently NH or CO, and n1 and n2 each are independently an integer from 1 to 6.

<12> The resin composition according to any one of <1> to <10>, wherein the structural unit comprising two or more alicyclic structures included in the second polyamide resin is represented by (3) below:

Formula (3)

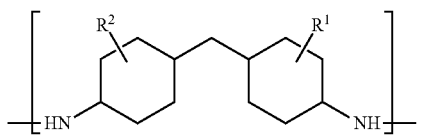

[Chem. 2]

wherein $R^1$ and $R^2$ each independently represent a hydrogen atom, or an alkyl group having from 1 to 4 carbon atoms.

<13> The resin composition according to any one of <1> to <12>, wherein a mass ratio of the second polyamide resin to the sum of the first polyamide resin and the second polyamide resin is from 20 to 80% by mass.

<14> The resin composition according to any one of <1> to <13>, wherein a melt viscosity of the resin composition at 280° C., an apparent shear rate of 1216 $sec^{-1}$, and a holding time period of 6 minutes is 380 Pa·s or less.

<15> A molded article formed from the resin composition described in any one of <1> to <14>.

According to the present invention, it has become possible to provide a low-viscosity resin composition formed from an amorphous polyamide resin, the resin composition having excellent fluidity while maintaining the transparency of the amorphous polyamide, and a molded article formed from the resin composition.

DESCRIPTION OF EMBODIMENTS

The contents of the present invention will be described in detail below. Note that, in the present specification, " . . . to . . . " is used to mean that the numerical values given before and after the "to" are included as the lower limit and the upper limit, respectively.

The resin composition according to the present invention includes a first polyamide resin and a second polyamide resin, the first polyamide resin is an amorphous polyamide resin comprising a structural unit derived from a diamine and a structural unit derived from a dicarboxylic acid, in which not less than 70 mol % of the structural unit derived from a diamine is a structural unit derived from isophorone diamine, and the structural unit derived from a dicarboxylic acid includes a structural unit derived from an α,ω-linear aliphatic dicarboxylic acid having 8 to 14 carbon atoms and a structural unit derived from an aromatic dicarboxylic acid, the second polyamide resin is an amorphous polyamide resin in which at least one type of the structural units constituting the second polyamide resin is a structural unit comprising two or more alicyclic structures, and a mass ratio of the second polyamide resin to the sum of the first polyamide resin and the second polyamide resin is from 10 to 90% by mass.

With such a configuration, a low-viscosity resin composition having excellent fluidity while maintaining transparency can be formed. In particular, the present invention can provide a resin composition that has transparency and can maintain excellent properties inherent to the second polyamide resin while maintaining properties of the first polyamide resin, that is, relatively low melt viscosity. Specifically, the present invention can provide a resin composition which maintains high impact resistance and has high elastic modulus, for example.

Furthermore, the resin composition according to the present invention can retain high chemical resistance of the first polyamide resin.

That is, an amorphous polyamide resin comprising a structural unit comprising two or more alicyclic structures is known in a related art. Specifically, there are known an amorphous polyamide resin comprising 4,4'-methylenebis (2-methylcyclohexane-1-amine) and isophthalic acid as main ingredients as described above (Grilamid TR-55, available from EMS-CHEMIE); an amorphous polyamide resin comprising 4,4'-methylenebis(2-methylcyclohexane-1-amine) and dodecanedioic acid as main ingredients (Grilamid TR-90, available from EMS-CHEMIE); an amorphous polyamide resin comprising 4,4'-methylenebis(cyclohexane-1-amine) and dodecanedioic acid as main ingredients (Trogamid myCX, available from Dicel-Evonik Ltd.); an amorphous polyamide resin comprising 4,4'-methylenebis(2-methylcyclohexane-1-amine) and sebacic acid as main ingredients (Rilsan Clear, available from ARKEMA K.K.); and a reinforcing grade of these. Such amorphous polyamide resin (second polyamide resin) having a structural unit that includes two or more alicyclic structures typically has high melt viscosity and poor fluidity. In the present invention, the first polyamide resin is blended in the second polyamide resin, and the melt viscosity of the resin composition is successfully reduced while maintaining high transparency. When another amorphous polyamide resin is blended in a known amorphous polyamide resin, miscibility tends to be poor, and further, there is concern for a decrease in transparency with a decrease in miscibility. However, in the present invention, the miscibility of the polyamide resins is improved by appropriately selecting the types of the first polyamide resin and the second polyamide resin.

The amorphous polyamide resin according to the present invention is a resin that has a crystal melting enthalpy ΔHm is less than 10 J/g, preferably 5 J/g or less, and more preferably 3 J/g or less, and the crystal melting enthalpy may be 1 J/g or less. The crystal melting enthalpy is measured in accordance with the method described in the examples below.

First Polyamide Resin

The resin composition according to the present invention includes a first polyamide resin.

The first polyamide resin is an amorphous polyamide resin comprising a structural unit derived from a diamine and a structural unit derived from a dicarboxylic acid, in which not less than 70 mol % of the structural unit derived from a diamine is a structural unit derived from isophorone diamine and the structural unit derived from a dicarboxylic acid includes a structural unit derived from an α,ω-linear aliphatic dicarboxylic acid having 8 to 14 carbon atoms and a structural unit derived from an aromatic dicarboxylic acid.

In the first polyamide resin, not less than 70 mol %, preferably not less than 80 mol %, more preferably not less than 90 mol %, even more preferably not less than 95 mol %, and yet even more preferably not less than 99 mol % of the structural unit derived from a diamine is a structural unit derived from isophorone diamine.

Examples of the diamine other than isophorone diamine include aliphatic diamines, such as 1,3-bis(aminomethyl)cyclohexane, 1,4-bis(aminomethyl)cyclohexane, tetramethylene diamine, pentamethylene diamine, hexamethylene diamine, octamethylene diamine, and nonamethylene diamine; aromatic diamines, such as p-phenylenediamine, m-xylylenediamine, and p-xylylenediamine; and the like. A single type of these other diamines may be used, or two or more types thereof may be used.

In the first polyamide resin, preferably, the structural unit derived from a dicarboxylic acid includes a structural unit derived from an α,ω-linear aliphatic dicarboxylic acid having 8 to 14 carbon atoms and a structural unit derived from an aromatic dicarboxylic acid, and the structural unit derived from a dicarboxylic acid includes from 30 to 80 mol % of a structural unit derived from an α,ω-linear aliphatic dicarboxylic acid having from 8 to 14 carbon atoms and from 70 to 20 mol % of a structural unit derived from an aromatic dicarboxylic acid (however, the total amount does not exceed 100 mol %).

Preferably from 30 to 80 mol %, more preferably from 45 to 80 mol %, further preferably from 50 to 80 mol %, even more preferably from 60 to 80 mol %, and yet even more preferably from 65 to 80 mol % of the structural unit derived from a dicarboxylic acid is a structural unit derived from an α,ω-linear aliphatic dicarboxylic acid having from 8 to 14 carbon atoms.

Furthermore, preferably from 70 to 20 mol %, more preferably from 55 to 20 mol %, further preferably from 50 to 20 mol %, even more preferably from 40 to 20 mol %, and yet even more preferably from 35 to 20 mol % of the structural unit derived from a dicarboxylic acid is a structural unit derived from an aromatic dicarboxylic acid.

In the first polyamide resin, only one type, or two or more types of the α,ω-linear aliphatic dicarboxylic acid having from 8 to 14 carbon atoms and the aromatic dicarboxylic acid each may be used. When two or more types are used, the total amount is preferably within the range described above.

In the present invention, of the structural units derived from a dicarboxylic acid, the total amount of the structural units derived from an α,ω-linear aliphatic dicarboxylic acid having from 8 to 14 carbons and the structural units derived from an aromatic dicarboxylic acid is preferably 90 mol % or more, more preferably 95 mol % or more, and even more preferably 99 mol % or more.

The α,ω-linear aliphatic dicarboxylic acid having from 8 to 14 carbon atoms is preferably an α,ω-linear aliphatic dicarboxylic acid having from 8 to 12 carbon atoms. Examples of the α,ω-linear aliphatic dicarboxylic acid having from 8 to 14 carbon atoms include suberic acid, azelaic acid, sebacic acid, 1,9-nonanedicarboxylic acid, and dodecanedioic acid, and at least one of sebacic acid and dodecanedioic acid is preferable.

Examples of the aromatic dicarboxylic acid include terephthalic acid, isophthalic acid, 1,3-naphthalenedicarboxylic acid, 1,4-naphthalenedicarboxylic acid, 1,8-naphthalenedicarboxylic acid, and 2,6-naphthalenedicarboxylic acid. At least one type of isophthalic acid, 1,3-naphthalenedicarboxylic acid, 1,4-naphthalenedicarboxylic acid, 1,8-naphthalenedicarboxylic acid, and 2,6-naphthalenedicarboxylic acid is preferable, and at least one of 2,6-naphthalenedicarboxylic acid and isophthalic acid is more preferable. Examples of the embodiment of the first polyamide resin include a form comprising substantially no structural unit derived from terephthalic acid. "Comprising substantially no structural unit derived from terephthalic acid" means that the proportion of the structural unit derived from terephthalic acid is 5 mol % or less, preferably 3 mol % or less, and more preferably 1 mol % or less, of the structural units derived from a dicarboxylic acid included in the first polyamide resin.

Examples of the dicarboxylic acid (other dicarboxylic acids), other than the α,ω-linear aliphatic dicarboxylic acid having 8 to 14 carbon atoms and the aromatic dicarboxylic acid, include an α,ω-linear aliphatic dicarboxylic acid having 8 or less carbon atoms (e.g., adipic acid and pimelic acid), and an alicyclic dicarboxylic acid (e.g., 1,3-cyclohexanedicarboxylic acid). One type, or two or more types of the other dicarboxylic acids may be used.

In the first polyamide resin, the molar ratio of the structural unit derived from an α,ω-linear aliphatic dicarboxylic acid having 8 to 14 carbon atoms and the structural unit derived from an aromatic dicarboxylic acid, (the structural unit derived from an α,ω-linear aliphatic dicarboxylic acid having from 8 to 14 carbon atoms)/(the structural unit derived from an aromatic dicarboxylic acid), in the structural unit derived from a dicarboxylic acid is preferably from 0.5 to 3.5, more preferably from 0.8 to 3.2, and even more preferably from 2.0 to 3.1. Within such a range, an amorphous polyamide resin excellent in various performances can be obtained.

Embodiments of preferred amorphous polyamide resins of the present invention are described below. Of course, the present invention is not limited to these embodiments.

A first embodiment of the first polyamide resin is an amorphous polyamide resin in which not less than 90 mol % of the structural unit derived from a diamine is a structural unit derived from isophorone diamine; the structural unit derived from a dicarboxylic acid includes from 30 to 80 mol % of a structural unit derived from an $\alpha,\omega$-linear aliphatic dicarboxylic acid having from 8 to 14 carbon atoms and from 70 to 20 mol % of a structural unit derived from an aromatic dicarboxylic acid; the structural unit derived from an $\alpha,\omega$-linear aliphatic dicarboxylic acid having from 8 to 14 carbon atoms includes at least one of a structural unit derived from sebacic acid and a structural unit derived from dodecanedioic acid; and the structural unit derived from an aromatic dicarboxylic acid includes at least one of a structural unit derived from 2,6-naphthalenedicarboxylic acid and a structural unit derived from isophthalic acid. In the first embodiment, an aspect in which the structural unit derived from an $\alpha,\omega$-linear aliphatic dicarboxylic acid having from 8 to 14 carbon atoms includes either one of the structural unit derived from sebacic acid and the structural unit derived from dodecanedioic acid, and an aspect in which it includes both of them are exemplified. Furthermore, in the first embodiment, an aspect in which either one of the structural unit derived from 2,6-naphthalenedicarboxylic acid and the structural unit derived from isophthalic acid is included, or an aspect in which both of them are included are exemplified.

A second embodiment of the first polyamide resin is an aspect in which the structural unit derived from a dicarboxylic acid includes from 30 to 80 mol % of the structural unit derived from dodecanedioic acid and from 70 to 20 mol % of the structural unit derived from an aromatic dicarboxylic acid in the first embodiment. In the second embodiment, (the structural unit derived from dodecanedioic acid)/(the structural unit derived from an aromatic dicarboxylic acid) is preferably from 2.8 to 3.2.

A third embodiment of the first polyamide resin is an aspect in which, in the first embodiment, the structural unit derived from a dicarboxylic acid includes from 30 to 80 mol % of the structural unit derived from sebacic acid and from 70 to 20 mol % of the structural unit derived from an aromatic dicarboxylic acid. In the third embodiment, (the structural unit derived from an $\alpha,\omega$-linear aliphatic dicarboxylic acid having from 8 to 14 carbon atoms)/(the structural unit derived from an aromatic dicarboxylic acid) is preferably from 0.8 to 2.5.

A fourth embodiment of the first polyamide resin is an aspect in which the structural unit derived from a dicarboxylic acid includes from 30 to 80 mol % of the structural unit derived from an $\alpha,\omega$-linear aliphatic dicarboxylic acid having 8 to 14 carbon atoms and from 70 to 20 mol % of the structural unit derived from 2,6-naphthalenedicarboxylic acid in the first embodiment. In the fourth embodiment, (the structural unit derived from dodecanedioic acid)/(the structural unit derived from an aromatic dicarboxylic acid) is preferably from 2.8 to 3.2.

A fifth embodiment of the first polyamide resin is an aspect in which the structural unit derived from a dicarboxylic acid includes from 30 to 80 mol % of the structural unit derived from an $\alpha,\omega$-linear aliphatic dicarboxylic acid having from 8 to 14 carbon atoms and from 70 to 20 mol % of the structural unit derived from isophthalic acid in the first embodiment. In the fifth embodiment, (the structural unit derived from an $\alpha,\omega$-linear aliphatic dicarboxylic acid having from 8 to 14 carbon atoms)/(the structural unit derived from an aromatic dicarboxylic acid) is preferably from 0.8 to 3.2.

Note that the first polyamide resin includes a structural unit derived from a dicarboxylic acid and a structural unit derived from a diamine, while it may also include a structural unit besides the structural unit derived from a dicarboxylic acid and the structural unit derived from a diamine, or other moieties such as a terminal group. Examples of other structural units include, but not limited to, a structural unit derived from lactams such as $\varepsilon$-caprolactam, valerolactam, laurolactam, and undecalactam; and aminocarboxylic acids such as 11-aminoundecanoic acid and 12-aminododecanoic acid. Furthermore, the first polyamide resin may include minor components such as additives used for synthesis.

Typically 95% by mass or more, preferably 98% by mass or more, and more preferably 99% by mass or more of the first polyamide resin used in the present invention is the structural unit derived from a dicarboxylic acid or the structural unit derived from a diamine.

The first polyamide resin is produced through a melt polycondensation (melt polymerization) method by adding a compound comprising a phosphorus atom. As the melt polycondensation method, preferable is a method in which a raw material diamine is added dropwise to a molten raw material dicarboxylic acid and heated under pressure to polymerize while condensed water is removed, or a method in which a salt formed from a raw material diamine and a raw material dicarboxylic acid is heated under pressure in the presence of water to polymerize in the molten state while added water and condensed water are removed.

Examples of the compound comprising a phosphorus atom added in the polycondensation system of the first polyamide resin include dimethylphosphinic acid, phenylmethylphosphinic acid, hypophosphorous acid, sodium hypophosphite, potassium hypophosphite, lithium hypophosphite, calcium hypophosphite, ethyl hypophosphite, phenylphosphonite, sodium phenylphosphonite, potassium phenylphosphonite, lithium phenylphosphonite, ethyl phenylphosphonite, phenyl phosphonic acid, ethyl phosphonic acid, sodium phenylphosphonate, potassium phenylphosphonate, lithium phenylphosphonate, diethyl phenylphosphonate, sodium ethylphosphonate, potassium ethylphosphonate, phosphorous acid, sodium hydrogen phosphite, sodium phosphite, triethyl phosphite, triphenyl phosphite, and pyrophosphorous acid. Among these, metal hypophosphites, such as sodium hypophosphite, potassium hypophosphite, lithium hypophosphite, and calcium hypophosphite, are preferably used due to a good effect of promoting the amidation reaction and an excellent anti-coloring effect. Calcium hypophosphite and sodium hypophosphite are particularly preferable. The compound comprising a phosphorus atom that can be used in the present invention is not limited to these compounds.

The first polyamide resin obtained by melt polycondensation is preferably taken out once, pelletized, and then dried to be used.

The first polyamide resin preferably has a melt viscosity of 100 Pa·s or more at 280° C., the apparent shear rate of 122 sec$^{-1}$, and the holding time period of 6 minutes, and more preferably 120 Pa·s or more. The upper limit of the melt viscosity is preferably 2300 Pa·s or less, more preferably 1000 Pa·s or less, further preferably 600 Pa·s or less, even more preferably 550 Pa·s or less, and yet even more preferably 490 Pa·s or less, and may be 300 Pa·s or less, 290 Pa·s or less, 280 Pa·s or less, and 275 Pa·s or less.

The first polyamide resin preferably has a melt viscosity of 80 Pa·s or more at 280° C., the apparent shear rate of 1216 sec$^{-1}$, and the holding time period of 6 minutes, and more preferably 90 Pa·s or more. The upper limit of the melt viscosity is preferably 350 Pa·s or less, more preferably 300 Pa·s or less, even more preferably 250 Pa·s or less, and yet even more preferably 230 Pa·s or less, and may be 150 Pa·s or less, 145 Pa·s or less, and 140 Pa·s or less.

The method for measuring the melt viscosity follows the method described in the examples described below. If the equipment employed in the examples is not readily available due to discontinuation of the equipment or the like, other equipment having the equivalent performance can be used. The same applies to other measurement methods described below.

The lower limit of a number average molecular weight of the first polyamide resin is preferably 8000 or more, and more preferably 10000 or more. The upper limit of the number average molecular weight is preferably 25000 or less, and more preferably 20000 or less. The method for measuring the number average molecular weight follows the method described in the examples described below.

By adjusting the number average molecular weight, the melt viscosity value can be adjusted.

The first polyamide resin has the glass transition temperature of preferably 130° C. or higher, more preferably 140° C. or higher, and even more preferably 145° C. or higher. In the present invention, such a high Tg can be achieved, and therefore has the advantage of having hardly reduced physical properties even under high-temperature conditions. That is, the resin composition of the present invention is highly valuable in that it can have a low melt viscosity while maintaining a high glass transition temperature. The upper limit of the glass transition temperature is not particularly limited and, for example, is preferably 220° C. or lower or may be 200° C., and even the glass transition temperature of 170° C. or lower is practically sufficient.

The method for measuring the glass transition temperature follows the method described in the examples described below.

The content of the first polyamide resin in the resin composition according to an embodiment of the present invention preferably has a lower limit of 10% by mass or more, and may be 15% by mass or more, 25% by mass or more, 35% by mass or more, and 45% by mass or more. Furthermore, the upper limit of the content of the first polyamide resin in the resin composition according to an embodiment of the present invention is preferably 90% by mass or less, and may be 85% by mass or less, 75% by mass or less, 65% by mass or less, and 55% by mass or less.

The resin composition according to an embodiment of the present invention may contain only one type of the first polyamide resin or may contain two or more types of the first polyamide resin. When two or more types of the first polyamide resin are included, the total amount is preferably in the above range. Note that when two or more types of the first polyamide resin are included, the melt viscosity, molecular weight, glass transition temperature, and the like of the first polyamide resin are defined as the melt viscosity and the like of the mixture. The same applies to the second polyamide resins.

Second Polyamide Resin

The resin composition of the present invention includes a second polyamide resin.

The second polyamide resin is an amorphous polyamide resin in which at least one type of the structural unit is a structural unit comprising two or more alicyclic structures.

Here, the "structural unit" refers to a repeating unit comprising one raw material monomer, and at least one type of a structural unit derived from a compound having two or three or more amino groups, a structural unit derived from a compound having two or three or more carboxy groups, and a structural unit derived from an aminocarboxylic acid (comprising a lactone ring in which an amino group and a carboxy group are dehydrated and condensed) is exemplified, and at least one type of a structural unit derived from a diamine and a structural unit derived from a dicarboxylic acid is preferable.

The structural unit comprising two or more cyclic structures preferably includes two to four cyclic structures, more preferably two or three cyclic structures, and even more preferably two cyclic structures in one structural unit. When the second polyamide resin includes two or more cyclic structures in this way, the miscibility with the first polyamide resin is increased to effectively maintain high transparency inherent to the amorphous polyamide resin. Furthermore, the melt viscosity of the resin composition can be relatively low compared to a case where only the second polyamide resin is used.

The alicyclic structure may be a single ring formed from one alicyclic ring, or may be a fused ring formed from two or more alicyclic rings. The second polyamide resin has two or more such cyclic structures in one structural unit. The two or more cyclic structures may be connected by a single bond in one structural unit or may be a group comprising a combination of two or more cyclic structures and other groups.

The alicyclic ring forming the cyclic structure is preferably a 5-membered ring and a 6-membered ring, and more preferably a 6-membered ring.

Examples of an embodiment of the structural unit include a structural unit represented by —NH—R-cyclic structure-R-cyclic structure-R—NH— (R represents a single bond or a divalent linking group, hereinafter the same), a structural unit represented by —CO—R-cyclic structure-R-cyclic structure-R—CO—, or a structural unit represented by —CO—R-cyclic structure-R-cyclic structure-R—NH—, and the structural unit represented by —NH—R-cyclic structure-R-cyclic structure-R—NH— is preferable. The preferred range of the divalent linking group as R is the same as that of R in Formula (1) described below.

In the present invention, the structural unit comprising two or more alicyclic structures is more particularly preferably a structural unit represented by Formula (1), more preferably a structural unit represented by Formula (2), even more preferably a structural unit represented by Formula (3), and yet even more preferably a structural unit represented by Formula (4).

Formula (1)

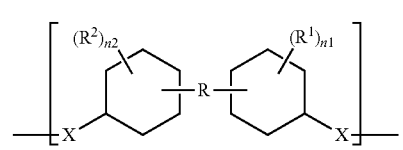

[Chem. 3]

In Formula (1), $R^1$ and $R^2$ each independently represent a hydrogen atom, or an alkyl group having 1 to 4 carbon atoms, R is a single bond or a divalent linking group, Xs each are independently NH or CO, and n1 and n2 each are independently an integer from 1 to 6.

Formula (2)

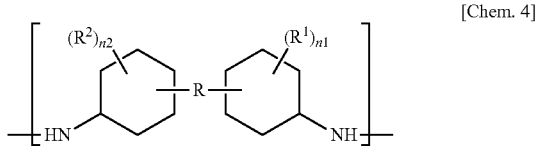

[Chem. 4]

In Formula (2), $R^1$ and $R^2$ each independently represent a hydrogen atom, or an alkyl group having from 1 to 4 carbon atoms, R is a single bond or a divalent linking group, and n1 and n2 each are independently an integer from 1 to 6.

Formula (3)

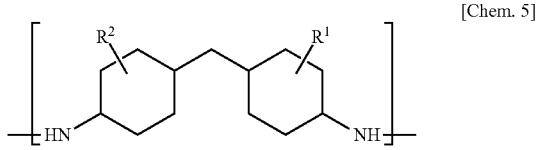

[Chem. 5]

In Formula (3), $R^1$ and $R^2$ each independently represent a hydrogen atom, or an alkyl group having from 1 to 4 carbon atoms.

Formula (4)

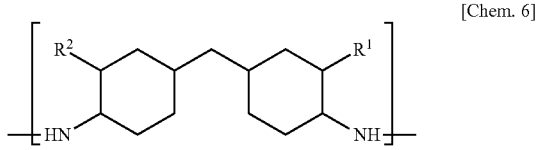

[Chem. 6]

In Formula (4), $R^1$ and $R^2$ each independently represent a hydrogen atom, or an alkyl group having from 1 to 4 carbon atoms.

In Formula (1), Xs each are independently NH or CO, and preferably NH.

In Formula (1) and Formula (2), R is a single bond or a divalent linking group. The divalent linking group is not particularly limited, but is preferably a group comprising an aliphatic hydrocarbon group or a combination of an aliphatic hydrocarbon group and —O— and/or —S—, and more preferably an aliphatic hydrocarbon group.

The aliphatic hydrocarbon group is preferably a linear or branched alkylene group, and more preferably a linear alkylene group. The number of carbons in the alkylene group is preferably from 1 to 15, more preferably from 1 to 8, even more preferably from 1 to 5, and yet even more preferably from 1 to 3. Examples of the alkylene group include a methylene group, an ethylene group, a propylene group, and a butylene group.

In Formula (1) to Formula (4), $R^1$ and $R^2$ each are independently preferably a hydrogen atom, a methyl group, an ethyl group, and a propyl group, more preferably a hydrogen atom, a methyl group, and an ethyl group, and even more preferably a hydrogen atom and a methyl group. The $R^1$ and $R^2$ may be the same group or may be different, but is preferably the same group.

In Formula (1) or Formula (2), n1 and n2 each are independently preferably an integer from 1 to 6, more preferably an integer from 1 to 4, even more preferably 1 or 2, and yet even more preferably 1.

Examples of a monomer that becomes a raw material of the structural unit comprising two or more cyclic structures include 4,4'-methylenebis(2-methylcyclohexane-1-amine), 4,4'-methylenebis(cyclohexane-1-amine), (4,4'-oxobis(cyclohexane-1-amine)), 4,4'-thiobis(cyclohexane-1-amine), 4,4'-methylenebis(2-methylcyclohexane-1-carboxylic acid), 4,4'-methylenebis(cyclohexane-1-carboxylic acid), 4,4'-thiobis(cyclohexane-1-amine)), 4,4'-methylenebis(2-methylcyclohexane-1-carboxylic acid), (4,4'-oxobis(cyclohexane-1-carboxylic acid)), 4,4'-thiobis(cyclohexane-1-carboxylic acid), decahydro-1,4-naphthalene dicarboxylic acid, and the like.

The second polyamide resin is an amorphous polyamide resin in which preferably not less than 10 mol %, more preferably 20 mol % or more, even more preferably 30 mol % or more, and yet even more preferably 40 mol % or more of the total of the structural unit included in the second polyamide resin is a structural unit comprising two or more alicyclic structures. The upper limit of the structural unit comprising two or more alicyclic structures may be all of the total of the structural unit (100 mol %), but preferably 50 mol % or less.

Examples of a structural unit besides the structural unit containing two or more alicyclic structures, which may be included in the second polyamide resin, include a structural unit comprising one alicyclic structure, a structural unit derived from an aliphatic diamine, a structural unit derived from an aliphatic dicarboxylic acid, a structural unit derived from an aromatic diamine, a structural unit derived from an aromatic dicarboxylic acid, and a structural unit derived from an aminocarboxylic acid other than an aminocarboxylic acid comprising two or more alicyclic structures.

The aliphatic diamine refers to a linear or branched aliphatic diamine, and a linear aliphatic diamine is preferable. Specific examples of the aliphatic diamine include tetramethylene diamine, pentamethylene diamine, hexamethylene diamine, 2-methylpentamethylene diamine, undecamethylene diamine, dodecamethylene diamine, 2,2,4-/2,4,4-trimethylhexamethylene diamine, and 5-methylnonamethylene diamine.

The aliphatic dicarboxylic acid refers to a linear or branched aliphatic dicarboxylic acid, a linear aliphatic dicarboxylic acid is preferable, an α,ω-linear aliphatic dicarboxylic acid having from 6 to 20 carbon atoms is more preferable, an α,ω-linear aliphatic dicarboxylic acid having from 6 to 15 carbon atoms is even more preferable, and an α,ω-linear aliphatic dicarboxylic acid having from 10 to 12 carbon atoms is yet even more preferable. Specific examples of the aliphatic dicarboxylic acid include adipic acid, pimelic acid, suberic acid, azelaic acid, sebacic acid, 1,9-nonanedicarboxylic acid, and dodecanedioic acid, and sebacic acid, 1,9-nonanedicarboxylic acid, and dodecanedioic acid are preferable, and sebacic acid and dodecanedioic acid are more preferable.

Examples of the aromatic diamine include metaxylylene diamine and paraxylylene diamine.

Examples of the aromatic dicarboxylic acid include terephthalic acid, isophthalic acid, 1,3-naphthalenedicarboxylic acid, 1,4-naphthalenedicarboxylic acid, 1,8-naphthalenedicarboxylic acid, and 2,6-naphthalenedicarboxylic acid. At least one type of isophthalic acid, 1,3-naphthalenedicarboxylic acid, 1,4-naphthalenedicarboxylic acid, 1,8-naphthalenedicarboxylic acid, and 2,6-naphthalenedicarboxylic acid is preferable, at least one of isophthalic acid and 2,6- naphthalenedicarboxylic acid is more preferable, and isophthalic acid is even more preferable.

The aminocarboxylic acid is preferably an $NH_2$-linear or branched aliphatic group-COOH and an $NH_2$-group containing an aromatic ring-COOH. Furthermore, the aminocarboxylic acid also includes a lactam in which an amino group and a carboxy group are dehydrated and condensed.

The linear or branched aliphatic group is preferably a linear or branched aliphatic group having from 6 to 20 carbon atoms, and more preferably a linear or branched aliphatic group having from 6 to 15 carbon atoms. The aliphatic group included in the aminocarboxylic acid is preferably a linear aliphatic group.

Examples of the aminocarboxylic acid include lactams such as ε-caprolactam, valerolactam, laurolactam, and undecalactam, and amino carboxylic acids such as 11-aminoundecanoic acid and 12-aminododecanoic acid, 12-aminododecanoic acid and laurolactam are more preferable, and 12-aminododecanoic acid is even more preferable.

The second polyamide resin may or need not include a structural unit derived from isophorone diamine. The proportion of the structural unit derived from isophorone diamine in the second polyamide resin is preferably less than 70 mol %, more preferably 20 mol % or less, still more preferably 10 mol % or less, even more preferably 5 mol % or less, and yet even more preferably 1 mol % of the structural unit derived from a diamine. The higher the proportion of isophorone diamine, the better the miscibility with the first polyamide resin, and the lower the melt viscosity of the resulting resin composition. On the other hand, the lower the proportion of isophorone diamine, the more properties derived from the second polyamide resin can be imparted to the resulting resin composition. In the present invention, the proportion of isophorone diamine can be appropriately adjusted depending on the desired application.

The structural unit included in the second polyamide resin refers to a structural unit derived from a dicarboxylic acid, a structural unit derived from a diamine, and a structural unit derived from an aminocarboxylic acid. The second polyamide resin includes (1) a structural unit derived from a diamine and a structural unit derived from a dicarboxylic acid; (2) a structural unit derived from an aminocarboxylic acid; or (3) at least one type of a structural unit derived from a diamine and a structural unit derived from a dicarboxylic acid (preferably both a structural unit derived from a diamine and a structural unit derived from a dicarboxylic acid), and a structural unit derived from an aminocarboxylic acid. Note that of course, in addition to the structural units described above, the second polyamide resin may include other moieties such as a terminal group, additive components used for synthesis of the polyamide resin, and the like.

The total of the structural unit derived from a diamine, the structural unit derived from a dicarboxylic acid, and the structural unit derived from an aminocarboxylic acid preferably accounts for 90% by mass or more, more preferably 95% by mass or more, and even more preferably 98% by mass or more in the second polyamide resin.

In the present invention, the second polyamide resin preferably includes (1) a structural unit derived from a diamine and a structural unit derived from a dicarboxylic acid, or (3) at least one type of a structural unit derived from a diamine and a structural unit derived from a dicarboxylic acid, and a structural unit derived from an aminocarboxylic acid.

As a first embodiment of the second polyamide resin, an amorphous polyamide resin in which preferably 50 mol % or more, more preferably 70 mol % or more, still more preferably 90 mol % or more, even more preferably 95 mol % or more, and yet even more preferably 99 mol % or more of the structural unit derived from a diamine includes a structural unit comprising two or more alicyclic structures is exemplified.

In variation of the structural unit derived from a dicarboxylic acid, an example of the first embodiment is a polyamide resin in which preferably 50 mol % or more, more preferably 70 mol % or more, even more preferably 80 mol % or more, still more preferably 90 mol % or more, yet even more preferably 95 mol % or more, and particularly even more preferably 99 mol % or greater of the structural unit derived from a dicarboxylic acid is derived from an aromatic dicarboxylic acid or an α,ω-linear aliphatic dicarboxylic acid having from 6 to 20 carbon atoms.

In variation of the structural unit derived from a dicarboxylic acid, another example of the first embodiment is a polyamide resin in which preferably 50 mol % or more, more preferably 70 mol % or more, even more preferably 80 mol % or more, still more preferably 90 mol % or more, yet even more preferably 95 mol % or more, and particularly even more preferably 99 mol % or more of the structural unit derived from a dicarboxylic acid is a structural unit derived from an aromatic dicarboxylic acid.

In variation of the structural unit derived from a dicarboxylic acid, still another example of the first embodiment is a polyamide resin in which preferably 50 mol % or more, more preferably 70 mol % or more, even more preferably 80 mol % or more, still more preferably 90 mol % or more, yet even more preferably 95 mol % or more, and particularly even more preferably 99 mol % or more of the structural unit derived from a dicarboxylic acid is a structural unit derived from an α,ω-linear aliphatic dicarboxylic acid having from 6 to 20 carbon atoms.

In the first embodiment, the proportion of the structural unit derived from an aminocarboxylic acid is preferably 30 mol % or less, more preferably 25 mol % or less, and even more preferably 20 mol % or less, and may be 5 mol % or less or 4 mol % or less. The proportion of the structural unit derived from an aminocarboxylic acid may be 0 mol % or may be 1 mol % or more.

As a second embodiment of the second polyamide resin, an amorphous polyamide resin in which preferably 50 mol % or more, more preferably 70 mol % or more, still more preferably 90 mol % or more, even more preferably 95 mol % or more, and yet even more preferably 99 mol % or more of the structural unit derived from a dicarboxylic acid includes a structural unit comprising two or more alicyclic structures is exemplified.

In the second embodiment, the structural unit derived from a diamine is preferably an aromatic diamine and an aliphatic diamine.

In the second embodiment, the proportion of the structural unit derived from an aminocarboxylic acid is preferably 30 mol % or less, more preferably 25 mol % or less, and even more preferably 20 mol % or less, and may be 5 mol % or less or 4 mol % or less. The proportion of the structural unit derived from an aminocarboxylic acid may be 0 mol % or may be 1 mol % or more.

As a third embodiment of the second polyamide resin, an amorphous polyamide resin in which preferably 50 mol % or more, more preferably 70 mol % or more, still more preferably 90 mol % or more, even more preferably 95 mol % or more, and yet even more preferably 99 mol % or more of the structural unit derived from a aminocarboxylic acid includes a structural unit comprising two or more alicyclic structures is exemplified.

In the present invention, the first embodiment is more preferable.

The second polyamide resin preferably has a melt viscosity of 150 Pa·s or more at 280° C., the apparent shear rate of 122 sec$^{-1}$, and the holding time period of 6 minutes, and more preferably 200 Pa·s or more. The upper limit of the melt viscosity is preferably 3000 Pa·s or less, more preferably 2500 Pa·s or less, even more preferably 2000 Pa·s or less, yet even more preferably 1800 Pa·s or less, still more preferably 1600 Pa·s or less, yet even more preferably 1400 Pa·s or less, and particularly even more preferably 1200 Pa·s or less.

The second polyamide resin preferably has a melt viscosity of 100 Pa·s or more at 280° C., the apparent shear rate of 1216 sec$^{-1}$, and the holding time period of 6 minutes, and more preferably 120 Pa·s or more. The upper limit of the melt viscosity is preferably 600 Pa·s or less, more preferably 550 Pa·s or less, even more preferably 500 Pa·s or less, still more preferably 450 Pa·s or less, and yet even more preferably 420 Pa·s or less.

The method for measuring the melt viscosity follows the method described in the examples described below.

The lower limit of a number average molecular weight of the second polyamide resin is preferably 8000 or more, and more preferably 10000 or more. The upper limit of the number average molecular weight is preferably 25000 or less, and more preferably 20000 or less. The method for measuring the number average molecular weight follows the method described in the examples described below.

The second polyamide resin has the glass transition temperature of preferably 100° C. or higher, more preferably 120° C. or higher, and even more preferably 130° C. or higher. In the present invention, such a high Tg can be achieved, and therefore has the advantage of having hardly reduced physical properties even under high-temperature conditions. The upper limit of the glass transition temperature is not particularly limited and, for example, is preferably 200° C. or lower or may be 180° C., and even the glass transition temperature of 170° C. or lower is practically sufficient.

The method for measuring the glass transition temperature follows the method described in the examples described below.

The lower limit of the content of the second polyamide resin in the resin composition according to an embodiment of the present invention is preferably 10% by mass or more, and may be 15% by mass or more, 25% by mass or more, 35% by mass or more, or 45% by mass or more. Furthermore, the upper limit of the content of the second polyamide resin in the resin composition according to an embodiment of the present invention is preferably 90% by mass or less, and may be 85% by mass or less, 75% by mass or less, 65% by mass or less, and 55% by mass or less.

The resin composition according to an embodiment of the present invention may contain only one type of the second polyamide resin or may contain two or more types thereof. The resin composition containing two or more types of the second polyamide preferably has a total amount of the second polyamide resin in the above range.

<Blend Form of Resin>

The mass ratio of the first polyamide resin and the second polyamide resin in the resin composition according to an embodiment of the present invention is such that the mass ratio of the second polyamide resin to the sum of the first polyamide resin and the second polyamide resin is from 10 to 90% by mass. A lower limit of the mass ratio of the second polyamide resin is preferably 15% by mass or more and may be 25% by mass or more, 35% by mass or more, or 45% by mass or more. Furthermore, an upper limit of the mass ratio of the second polyamide resin is preferably 90% by mass or less, and may be 85% by mass or less, 75% by mass or less, 65% by mass or less or 55% by mass or less.

In the resin composition according to an embodiment of the present invention, the second polyamide resin typically has a higher melt viscosity than that of the first polyamide resin. The difference between the melt viscosities of the first polyamide resin and the second polyamide resin is preferably 50 Pa·s or more in the melt viscosities, more preferably 100 Pa·s or more, even more preferably 200 Pa·s or more, and may be 300 Pa·s or more, 400 Pa·s or more, and 500 Pa·s or more, at 280° C., the apparent shear rate of 122 sec$^{-1}$, and the holding time period of 6 minutes. The upper limit of the difference between the melt viscosities of the first polyamide resin and the second polyamide resin is not particularly limited, but, for example, the melt viscosity of the second polyamide resin minus 80 Pa·s or less.

In addition, the difference between melt viscosities of the first polyamide resin and the second polyamide resin is preferably 30 Pa·s or more in the melt viscosities, more preferably 50 Pa·s or more, more preferably 100 Pa·s or more, and may be 200 Pa·s or more, 250 Pa·s or more, and 270 Pa·s or more, at 280° C., the apparent shear rate of 1216 sec$^{-1}$, and the holding time period of 6 minutes. The upper limit of the difference between the melt viscosities of the first polyamide resin and the second polyamide resin is not particularly limited, but, for example, the melt viscosity of the second polyamide resin minus 60 Pa·s or less.

By blending the polyamide resin having the difference in melt viscosity in this way, it is possible to achieve characteristics (mechanical strength and heat resistance, for example) inherent to the second polyamide resin while maintaining a low melt viscosity inherent to the first polyamide resin. In particular, in the present invention, by appropriately selecting the structures of the first polyamide resin and the second polyamide resin, miscibility between the two can be enhanced, and it is possible to make a low-viscosity resin composition with excellent fluidity while maintaining the amorphous polyamide-specific transparency.

The resin composition according to an embodiment of the present invention may include an amorphous polyamide resin and a crystalline polyamide resin besides the first polyamide resin and the second polyamide resin. Specific examples of such other polyamide resins include polyamide 6, polyamide 66, polyamide 46, polyamide 6/66 (copolymer formed from a polyamide 6 component and a polyamide 66 component), polyamide 610, polyamide 612, polyamide 11, polyamide 12, MXD6 (poly(m-xylylene adipamide)), MPXD6 (poly(m-, p-xylylene adipamide)), MXD10 (poly(m-xylylene sebacamide)), MPXD10 (poly(m-, p-xylylene sebacamide)), and PXD10 (poly(p-xylylene sebacamide)). One of these other polyamide resins, or two or more thereof may be used.

When the resin composition according to an embodiment of the present invention includes an amorphous polyamide resin besides the first polyamide resin and the second polyamide resin, the content thereof is preferably 10% by mass or less, and more preferably from 1 to 10% by mass, of the resin component included in the resin composition of the present invention. In addition, the resin composition according to an embodiment of the present invention can be configured to include substantially no amorphous polyamide resin other than the first polyamide resin and the second polyamide resin. "Substantially no amorphous polyamide resin" means less than 1% by mass of the resin component included in the resin composition according to an embodiment of the present invention.

When the resin composition according to an embodiment of the present invention includes a crystalline polyamide resin, the content thereof is preferably 10% by mass or less, and more preferably from 1 to 10% by mass, of the resin component included in the resin composition according to the present invention. In addition, the resin composition according to an embodiment of the present invention may be configured to include substantially no crystalline polyamide resin. "Substantially no crystalline polyamide resin" means less than 1% by mass of the resin component included in the resin composition according to an embodiment of the present invention.

The resin composition according to an embodiment of the present invention may contain a thermoplastic resin besides the polyamide resins described above. Examples of the thermoplastic resin other than the polyamide resins include: polyester resins such as polyethylene terephthalate, polybutylene terephthalate, polyethylene naphthalate, and polybutylene naphthalate; and polyolefin resins such as polypropylene (PP), cycloolefin polymer (COP), and cycloolefin copolymer (COC). One of these thermoplastic resins other than polyamide resins, or two or more thereof may be used.

When the resin composition according to an embodiment of the present invention includes a thermoplastic resin besides the polyamide resin, the content thereof is preferably 10% by mass or less, and more preferably from 1 to 10% by mass, of the resin component included in the resin composition according to the present invention. In addition, the resin composition according to an embodiment of the present invention may be configured to include substantially no thermoplastic resin other than the polyamide resins. "Substantially no thermoplastic resin" means less than 1% by mass or less of the resin component included in the resin composition according to an embodiment of the present invention.

Other Components

The resin composition according to an embodiment of the present invention may include only the first polyamide resin and the second polyamide resin, or may include other components.

As the other components, in addition to the resin components described above, additives such as fillers, matting agents, heat resistant stabilizers, weather resistant stabilizers, ultraviolet absorbents, plasticizers, flame retardants, antistatic agents, anti-coloration agents, anti-gelling agents, impact modifiers, lubricants, colorants, and conductive additives can be added as necessary. One of these additives, or two or more thereof may be used.

Characteristics of Resin Composition

The resin composition according to an embodiment of the present invention preferably has an upper limit of the melt viscosity of 1400 Pa·s or less, more preferably 1200 Pa·s or less, even more preferably 1000 Pa·s or less, and yet even more preferably 950 Pa·s or less, and may have an upper limit value of 920 Pa·s or less, at 280° C., the apparent shear rate of 122 sec$^{-1}$, and the holding time period of 6 minutes. The lower limit of the melt viscosity is preferably 160 Pa·s or more, and more preferably 200 Pa·s or more.

The resin composition according to an embodiment of the present invention preferably has an upper limit of the melt viscosity of 500 Pa·s or less, and more preferably 450 Pa·s or less, even more preferably 400 Pa·s or less, and yet even more preferably 380 Pa·s or less, and may have an upper limit value of 350 Pa·s or less and 340 Pa·s or less, at 280° C., the apparent shear rate of 1216 sec$^{-1}$, and the holding time period of 6 minutes. The lower limit of the melt viscosity is preferably 100 Pa·s or more, and more preferably 120 Pa·s or more.

The melt viscosity of the resin composition is measured in accordance with the description of the examples below.

The resin composition according to an embodiment of the present invention can be a polyamide resin having excellent mechanical strength.

The resin composition according to an embodiment of the present invention has a flexural modulus in accordance with JIS K 7171 of preferably 1.6 GPa or more, and may has a flexural modulus of 2.0 GPa or more. The upper limit thereof is not particularly limited and, for example, the upper limit of 4.0 GPa or less or even 3.5 GPa or less is a practically sufficient.

The resin composition according to an embodiment of the present invention has a notched Charpy impact strength in accordance with JIS K 7111-1 of preferably 4.0 kJ/m$^2$ or more, and more preferably 4.3 kJ/m$^2$ or more. The upper limit thereof is not particularly limited and, for example, the upper limit of 9.0 kJ/m$^2$ or less or even 8.7 kJ/m$^2$ or less is a practically sufficient.

A haze value measured when the resin composition according to an embodiment of the present invention is molded to have a thickness of 2 mm is preferably 2.0% or less, more preferably 1.7% or less, even more preferably 1.6% or less, and yet even more preferably 1.5% or less. The lower limit of the haze value is ideally 0%, but even a haze value of 1.0% or more is a practically sufficient.

The flexural modulus, Charpy impact strength, and haze are measured in accordance with the description of the examples below.

Applications

The resin composition according to an embodiment of the present invention can be made into a fiber-reinforced resin composition by blending reinforcing fibers therein. Examples of reinforcing fibers include carbon fibers and glass fibers. Examples of the fiber-reinforced resin composition include a pellet obtained by melt-kneading a composition comprising the resin composition according to an embodiment of the present invention and reinforcing fibers, and a prepreg in which reinforcing fibers are impregnated with the resin composition according to an embodiment of the present invention or the resin composition is brought in proximity to reinforcing fibers.

The resin composition according to an embodiment of the present invention can be also molded by a known molding method such as injection molding, blow molding, extrusion molding, compression molding, stretching, and vacuum molding.

A molded article formed from the resin composition according to an embodiment of the present invention can be used in various molded articles comprising a film, a sheet, a thin-walled molded article, a hollow molded article, a fiber, a hose, and a tube.

The resin composition according to an embodiment of the present invention is preferably used in engineering plastic applications. Examples of fields of use of such molded articles include transportation equipment components such as automobiles, general mechanical parts, precision mechanical parts, electronic and electrical equipment components, OA device parts, building materials and resident related components, medical devices, optical products, industrial materials, leisure sporting devices, amusements, medical products, articles for daily use such as food packaging films, and defense and aerospace products. Examples of the molded article of the present invention include housing of electronic and electrical components, sunglasses, and the like.

Another example of an embodiment of the molded article formed from the resin composition of the present invention is a single layer or multi-layer container comprising a layer formed from the resin composition of the present invention. Examples of the multi-layer container include a multi-layer container comprising a layer formed from a composition comprising a polyolefin resin, a layer formed from the resin composition of the present invention, and a layer formed from a composition comprising a polyolefin resin in this order. Examples of the polyolefin resin include polypropylene (PP), cycloolefin polymer (COP), and cycloolefin copolymer (COC). Furthermore, an adhesive layer may be provided between a layer formed from a composition comprising the polyolefin resin and a layer formed from the resin composition of the present invention. Such multi-layer containers can be preferably used as food or pharmaceutical containers. Examples of pharmaceutical containers include ampoules, vials, vacuum blood collection tubes, and pre-filled syringes.

EXAMPLES

The present invention will be described in more detail below through examples. The following materials, usage amounts, proportions, processing details, processing procedures, and the like described in the examples may be changed, as appropriate, as long as there is no deviation from the spirit of the present invention. Therefore, the scope of the present invention is not limited to the specific examples described below.

1. Raw Material

First Polyamide Resin

The following resins synthesized in the following synthesis examples were used.

Synthesis of Resin IPD12I

In a pressure-resistant reaction vessel having an internal volume of 50 L and equipped with a stirrer, a partial condenser, a total condenser, a pressure regulator, a thermometer, a dropping funnel and a pump, an aspirator, a nitrogen introduction tube, a bottom drain valve, and a strand die, precisely weighed 9660 g (41.6 mol) of dodecanedioic acid (DDA, available from LAIYANG HIMOUNT BIO-PRODUCTS TECHNOLOGY CO., LTD.), 2305 g (13.86 mol) of isophthalic acid (PIA, available from Mitsubishi Gas Chemical Co., Ltd.), 1.67 g (0.0016 mol) of sodium hypophosphite (available from Kanto Chemical Co., Ltd.), and 1.16 g (0.0141 mol) of sodium acetate (available from Kanto Chemical Co., Inc.) were charged, and after it was purged with nitrogen sufficiently, the inside of the reaction vessel was sealed, and the temperature was raised to 180° C. under stirring while the pressure in the vessel was maintained at 0.4 MPa. After the temperature reached 180° C., dropwise addition of 9645 g (54.45 mol) of isophorone diamine (IPDA, available from BASF SE) stored in the dropping funnel into the raw materials in the reaction vessel was initiated. The temperature in a reaction tank was raised to 260° C. while generated condensed water was removed from the system and while the pressure in the vessel was maintained at 0.4 MPa. After the completion of dropwise addition of IPDA, the pressure in the reaction vessel was gradually returned to normal pressure while the temperature was gradually raised to 280° C., and then the pressure inside the reaction tank was reduced to 80 kPa using an aspirator to remove the condensed water. Agitation torque of the stirrer was observed under a reduced pressure, and agitation was terminated when a predetermined torque was reached. Then, the inside of the reaction tank was pressurized with nitrogen, the bottom drain valve was opened, and the polymer was extruded from the strand die to form a strand and then cooled and pelletized by using a pelletizer to obtain a polyamide resin.

The melt viscosity at 280° C., the apparent shear rate of 1216 sec$^{-1}$, and the holding time period of 6 minutes, and the melt viscosity at 280° C., the apparent shear rate 122 sec$^{-1}$, and the holding time period of 6 minutes of the obtained polyamide resin are shown in Reference Example 1 in Table 1.

The glass transition temperature of the obtained polyamide resin was 146° C., and the number average molecular weight was 12900.

Synthesis of Resin IPD12N

In a pressure-resistant reaction vessel having an internal volume of 50 L and equipped with a stirrer, a partial condenser, a total condenser, a pressure regulator, a thermometer, a dropping funnel and a pump, an aspirator, a nitrogen-introducing tube, a bottom drain valve, and a strand die, precisely weighed 8000 g (34.74 mol) of DDA, 2503 g (11.58 mol) of 2,6-naphthalenedicarboxylic acid (2,6-NDCA, available from BP), 1.37 g (0.0081 mol) of calcium hypophosphite (available from Kanto Chemical Co., Inc.), and 0.6 g (0.0073 mol) of sodium acetate (available from Kanto Chemical Co., Inc.) were charged, and after it was purged with nitrogen sufficiently, the inside of the reaction vessel was sealed, and the temperature was raised to 180° C. under stirring while the pressure in the vessel was maintained at 0.4 MPa. After the temperature reached 180° C., dropwise addition of 7785 g (45.71 mol) of IPDA (available from Daicel-Evonik Ltd.) stored in the dropping funnel into the raw materials in the reaction vessel was initiated. The temperature in the reaction tank was raised to 260° C. while generated condensed water was removed from the system and while the pressure in the vessel was maintained at 0.4 MPa. After the completion of dropwise addition of IPDA, the pressure in the reaction vessel was gradually returned to normal pressure while the temperature was gradually raised to 280° C., and then the pressure inside the reaction tank was reduced to 80 kPa using an aspirator to remove the condensed water. Agitation torque of the stirrer was observed under a reduced pressure, and agitation was terminated when a predetermined torque was reached. Then, the inside of the reaction tank was pressurized with nitrogen, the bottom drain valve was opened, and the polymer was extruded from the strand die to form a strand and then cooled and pelletized by using a pelletizer to obtain a polyamide resin.

The melt viscosity at 280° C., the apparent shear rate of 1216 sec$^{-1}$, and the holding time period of 6 minutes, and the melt viscosity at 280° C., the apparent shear rate of 122 sec$^{-1}$, and the holding time period of 6 minutes of the formed polyamide resin are shown in Reference Example 3 in the table described below.

The glass transition temperature of the formed polyamide resin was 150° C., and the number average molecular weight was 17000.

Synthesis of Resin IPD10I

In the synthesis of the resin IPD12I described above, a polyamide resin was synthesized, while a diamine, which was a raw material of a polyamide resin, was changed to 10786 g (63.3) mol of IPDA, and a dicarboxylic acid was changed to 9500 g (46.6) mol of sebacic acid.

The melt viscosity at 280° C., the apparent shear rate of 1216 sec$^{-1}$, and the holding time period of 6 minutes, and the melt viscosity at 280° C., the apparent shear rate of 122 sec$^{-1}$, and the holding time period of 6 minutes of the formed polyamide resin are shown in Reference Example 2 in the table described below.

The glass transition temperature of the formed polyamide resin was 161° C., and the number average molecular weight was 14700.

Second Polyamide Resin

Any of the polyamide resins described below was used.

TR55:

An amorphous polyamide resin formed by polycondensing about 40 mol % of Grilamid TR-55, 4,4'-methylenebis (2-methylcyclohexane-1-amine), available from EMS-CHEMIE, about 40 mol % of isophthalic acid, and less than 20 mol % of 12-aminododecanoic acid.

The melt viscosity at 280° C., the apparent shear rate of 1216 sec$^{-1}$, and the holding time period of 6 minutes, and the melt viscosity at 280° C., the apparent shear rate of 122 sec$^{-1}$, and the holding time period of 6 minutes of TR55 are shown in Comparative Example 1 in Table 1. The glass transition temperature of TR55 was 165° C.

Trogamid myCX:

An amorphous polyamide resin formed by polycondensing Trogamid myCX, 4,4'-methylenebis(cyclohexane-1-amine) available from Daicel-Evonik Ltd. and dodecanedioic acid.

The melt viscosity at 280° C., the apparent shear rate of 1216 sec$^{-1}$, and the holding time period of 6 minutes, and the melt viscosity at 280° C., the apparent shear rate of 122 sec$^{-1}$, and the holding time period of 6 minutes of myCX are shown in Comparative Example 2 in Table 2. The glass transition temperature of Trogamid myCX was 130° C.

Rilsan Clear:

An amorphous polyamide resin formed by polycondensing Rilsan Clear, 4,4'-methylenebis(2-methylcyclohexane-1-amine) available from ALKEMA K.K. and sebacic acid.

The melt viscosity at 280° C., the apparent shear rate of 1216 sec$^{-1}$, and the holding time period of 6 minutes, and the melt viscosity at 280° C., the apparent shear rate of 122 sec$^{-1}$, and the holding time period of 6 minutes of Rilsan Clear are shown in Comparative Example 3 in Table 2. The glass transition temperature of Rilsan Clear was 145° C.

TR90:

An amorphous polyamide resin formed by polycondensing Grilamid TR90, 4,4'-methylenebis(2-methylcyclohexane-1-amine) available from EMS-CHEMIE. and dodecanedioic acid.

The melt viscosity at 280° C., the apparent shear rate of 1216 sec$^{-1}$, and the holding time period of 6 minutes, and the melt viscosity at 280° C., the apparent shear rate of 122 sec$^{-1}$, and the holding time period of 6 minutes of TR90 are shown in Comparative Example 4 in Table 2. The glass transition temperature of TR90 was 156° C.

G21:

A crystalline polyamide resin formed by polycondensing 50 mol % of Grilamid G21, hexamethylenediamine available from EMS-CHEMIE, 25 mol % of isophthalic acid, and 25 mol % of terephthalic acid.

Furthermore, it was found that the polyamide resins other than G21 and Trogamid myCX had crystal melting enthalpies ΔHm of substantially 0 J/g in the process of increasing temperature, and these were amorphous polyamide resins.

2. Measurement Method

Measurement of Melt Viscosity

On the produced polyamide resins described above, measurement was made using a capilograph, and using a die with a diameter of 1 mm and a length of 10 mm under the following conditions: an apparent shear rate of 1216 sec$^{-1}$ or 122 sec$^{-1}$, a measurement temperature of 280° C., a holding time period of 6 minutes, and a moisture content of the polyamide resin of 1000 mass ppm or less. In the present example, Capilograph D-1 (available from Toyo Seiki Seisaku-sho, Ltd.) was used.

Measurement of Glass Transition Temperature (Tg)

Using a differential scanning calorimeter (DSC), the glass transition temperature was measured when heating was performed at the temperature increase rate of 10° C./min from room temperature to 250° C., then cooling was immediately performed to room temperature or lower, and then heating was performed again at the temperature increase rate of 10° C./min from the room temperature to 250° C. in a nitrogen stream. In the present example, DSC-60 available from Shimadzu Corporation was used as the differential scanning calorimeter.

Furthermore, in accordance with JIS K 7121 and K 7122, the crystal melting enthalpy ΔHm of the polyamide resin was measured during the process of increasing the temperature.

Measurement of Number Average Molecular Weight (Mn)

In a mixed solvent of phenol/ethanol of 4/1 (volume ratio), 0.3 g of the polyamide resin was added and stirred at 25° C. until completely dissolved. Next, under agitation, the inner wall of a container was rinsed with 5 mL of methanol, and neutralization titration was performed with a 0.01 mol/L hydrochloric acid aqueous solution to determine the terminal amino group concentration [NH$_2$]. Furthermore, 0.3 g of the polyamide resin was added to benzyl alcohol and stirred at 170° C. in a nitrogen stream until completely dissolved. Next, the mixture was cooled to 80° C. or lower in a nitrogen stream, after which under agitation, the inner wall of the container was rinsed with 10 mL of methanol, and neutralization titration was performed with a 0.01 mol/L sodium hydroxide aqueous solution to determine the terminal carboxyl group concentration [COOH]. The number average molecular weight was determined from the measured terminal amino group concentration [NH$_2$] (unit: μeq/g) and the measured terminal carboxyl group concentration [COOH] (unit: μeq/g) by the following equation:

$$\text{Number average molecular weight (Mn)} = 2000000/([COOH]+[NH_2])$$

3. Reference Examples 1 to 3, Examples 1 to 18, and Comparative Examples 1 to 5 Compound The polyamide resin described above (in the form of a pellet) was weighed to have an amount (part by mass) described below, dry-blended, loaded into a twin-screw extruder (TEM26SX, available from Toshiba Machine Co., Ltd.) from its base, and then melted and extruded at 260 to 300° C., and the resulting strand was water-cooled in a water bath and then pelletized to produce a pellet. The obtained pellet was vacuum-dried at 120° C. (dew point: −40° C.) for 24 hours, and then molded with an injection molding machine (SE130DU-HP, available from Sumitomo Heavy Industries, Ltd.) to ISO test pieces of 4 mm×10 mm×80 mm, under conditions of 100° C. of the mold temperature and 280° C. of the cylinder temperature.

In addition, a haze measurement test piece of 2 mm×100 mm×100 mm was produced for haze measurement.

Charpy Impact Strength

The ISO test piece obtained above was processed in accordance with JIS K 7144 into a notched test piece. For the notched test piece, Charpy notched impact strength was measured in accordance with JIS K 7111-1.

Flexural Modulus

Flexural modulus of the ISO test piece described above was measured by the method in accordance with JIS K 7171.

In the present examples, the Bend Graph II available from Toyo Seiki Seisaku-sho, Ltd. was used as the flexural tester.

Haze

Haze of the test piece for haze measurement obtained above was measured using a haze meter.

The COH400 available from Nippon Denshoku Industries Co., Ltd. was used for the measurement.

Chemical Resistance Test (Mass Retention Rate)

The ISO test piece described above was immersed in toluene at 23° C.

Mass retention rates were measured for the ISO test piece on Day 7 and Day 30 after immersion.

Mass retention rate=[(mass of ISO test piece immersed in toluene)/(mass of ISO test piece before immersion in toluene)]×100 (unit: %)

Chemical Resistance Test (Strength Retention Rate, Modulus Retention Rate)

The ISO test piece described above was immersed in toluene at 23° C.

Flexural properties (flexural strength and flexural modulus) were measured for the ISO test pieces at Day 7 and Day 30 after immersion. The flexural property retention rate (flexural strength retention rate and flexural modulus retention rate) was calculated as follows. Note that the flexural modulus was measured in accordance with the method described above and the flexural strength was measured by the method in accordance with JIS K7171.

Flexural property retention rate=[(flexural property of ISO test piece immersed in toluene)/(flexural property of ISO test piece before immersion in toluene)]×100 (unit: %)

TABLE 1

| | | Reference Example 1 | Example 1 | Example 2 | Example 3 | Example 4 | Example 5 | Example 6 | Example 7 | Comparative Example 1 |
|---|---|---|---|---|---|---|---|---|---|---|
| Type of first polyamide resin | | | | | | IPD12I | | | | |
| Proportion of first polyamide resin | | 100 | 80 | 70 | 60 | 50 | 40 | 30 | 20 | 0 |
| Type of second polyamide resin | | | | | | TR55 | | | | |
| Proportion of second polyamide resin | | 0 | 20 | 30 | 40 | 50 | 60 | 70 | 80 | 100 |
| Melt viscosity | 122 sec$^{-1}$ | 149 | 300 | 381 | 474 | 551 | 596 | 700 | 808 | 1000 |
| | 1216 sec$^{-1}$ | 93 | 170 | 198 | 230 | 258 | 275 | 308 | 338 | 414 |
| Charpy impact strength | kJ/m$^2$ | 4.4 | 4.5 | 4.7 | 5 | 6.3 | 6.4 | 6.6 | 6.7 | 8.5 |
| Flexural modulus | GPa | 2.2 | 2.2 | 2.2 | 2.1 | 2.1 | 2.1 | 2.1 | 2.1 | 1.9 |
| Haze | % | 1.4 | 1.4 | 1.4 | 1.4 | 1.4 | 1.3 | 1.4 | 1.3 | 1.2 |

TABLE 2

| | | Example 8 | Example 9 | Example 10 | Comparative Example 2 | Example 11 | Example 12 | Example 13 | Example 14 | Comparative Example 3 | Example 15 | Comparative Example 4 |
|---|---|---|---|---|---|---|---|---|---|---|---|---|
| Type of first polyamide resin | | | | | | | IPD12I | | | | | |
| Proportion of first polyamide resin | | 80 | 50 | 20 | 0 | 80 | 30 | 20 | 10 | 0 | 20 | 0 |
| Type of second polyamide resin | | | Trogamid myCX | | | | Rilsan Clear | | | | TR90 | |
| Proportion of second polyamide resin | | 20 | 50 | 80 | 100 | 20 | 70 | 80 | 90 | 100 | 80 | 100 |
| Melt viscosity | 122 sec$^{-1}$ | 249 | 380 | 765 | 1006 | 360 | 802 | 824 | 860 | 1188 | 699 | 1015 |
| | 1216 sec$^{-1}$ | 149 | 202 | 325 | 378 | 177 | 309 | 316 | 326 | 392 | 291 | 377 |
| Charpy impact strength | kJ/m$^2$ | 4.5 | 6.1 | 8.5 | 9.2 | 5.2 | 6.4 | 6.8 | 8.2 | 12 | 6.6 | 10 |
| Flexural modulus | GPa | 2.1 | 1.8 | 1.6 | 1.5 | 2.0 | 1.8 | 1.7 | 1.6 | 1.5 | 1.6 | 1.5 |
| Haze | % | 1.5 | 1.5 | 1.5 | 1.5 | 1.4 | 1.4 | 1.4 | 1.5 | 1.5 | 1.4 | 1.4 |

TABLE 3

| | | Reference Example 2 | Example 16 | Example 17 | Reference Example 3 | Example 18 | Comparative Example 5 |
|---|---|---|---|---|---|---|---|
| Type of first polyamide resin | | | IPD10I | | | IPD12N | IPD12I |
| Proportion of first polyamide resin | | 100 | 50 | 20 | 100 | 80 | 50 |
| Type of second polyamide resin | | | TR55 | | | | G21 |
| Proportion of second polyamide resin | | 0 | 50 | 80 | 0 | 20 | 50 |
| Melt viscosity at 280° C. | 122 sec$^{-1}$ | 272 | 655 | 900 | 477 | 622 | Not miscible |
| | 1216 sec$^{-1}$ | 159 | 287 | 371 | 221 | 324 | |
| Charpy impact strength | kJ/m$^2$ | 2.8 | 6.8 | 7.8 | 4.6 | 5.7 | |
| Flexural modulus | GPa | 2.3 | 2.1 | 2.0 | 2.5 | 2.1 | |
| Haze | % | 1.3 | 1.5 | 1.4 | 1.4 | 1.4 | |

TABLE 4

|  |  | Reference Example 1 | Example 9 | Comparative Example 2 | Example 15 | Comparative Example 4 |
|---|---|---|---|---|---|---|
| Day 7 | Mass retention rate | 100 | 99 | 96 | 96 | 93 |
|  | Modulus retention rate | 99 | 97 | 88 | 86 | 82 |
|  | Strength retention rate | 93 | 90 | 86 | 86 | 57 |
| Day 30 | Mass retention rate | 99 | 98 | 93 | 92 | 87 |
|  | Modulus retention rate | 102 | 97 | 79 | 81 | 75 |
|  | Strength retention rate | 92 | 87 | 73 | 69 | 59 |

As is clear from the above results, it was possible to reduce the melt viscosity of the resin composition of the present invention without impairing the haze, compared to the case where the resin composition included only the second polyamide resin (Comparative Example 1, Comparative Example 2, Comparative Example 3, and Comparative Example 4). Furthermore, it was also possible to improve mechanical strength (Examples 1 to 18). In particular, since it is possible to improve the melt viscosity while maintaining transparency, the fluidity of the resin composition increases, molding (particularly extrusion) at a lower temperature is possible, and in addition, it is possible to effectively suppress the generation of gel or outgas or deterioration of the polyamide resin.

Furthermore, the resin composition of the present invention had excellent chemical resistance (Table 4).

On the other hand, even when the second polyamide resin was blended, the first polyamide resin and the second polyamide resin were not compatible with each other when the second polyamide resin was not a polyamide resin that was a structural unit comprising two or more alicyclic structures (Comparative Example 5).

The invention claimed is:

1. A resin composition comprising a first polyamide resin and a second polyamide resin,
    the first polyamide resin being an amorphous polyamide resin comprising a structural unit derived from a diamine and a structural unit derived from a dicarboxylic acid,
    70 mol % or more of the structural unit derived from a diamine being a structural unit derived from isophorone diamine,
    the structural unit derived from a dicarboxylic acid comprising a structural unit derived from an α,ω-linear aliphatic dicarboxylic acid having from 8 to 14 carbon atoms and a structural unit derived from an aromatic dicarboxylic acid,
    the second polyamide resin being an amorphous polyamide resin in which at least one type of the structural unit included in the second polyamide resin is a structural unit comprising two or more alicyclic structures,
    a mass ratio of the second polyamide resin to the sum of the first polyamide resin and the second polyamide resin being from 10 to 90% by mass,
    the first polyamide resin having a melt viscosity of 100 Pa·s or more and 490 Pa·s or less at 280° C., an apparent shear rate of 122 sec$^{-1}$, and a holding time period of 6 minutes, and
    a difference between melt viscosities of the first polyamide resin and the second polyamide resin is 50 Pa·s or more at 280° C., an apparent shear rate of 122 sec$^{-1}$, and a holding time period of 6 minutes.

2. The resin composition according to claim 1, wherein, in the second polyamide resin, 40 mol % or more of the total of the structural unit included in the second polyamide resin is the structural unit comprising two or more alicyclic structures.

3. The resin composition according to claim 2, wherein, in the first polyamide resin, the structural unit derived from a dicarboxylic acid comprises from 30 to 80 mol % of the structural unit derived from an α,ω-linear aliphatic dicarboxylic acid having from 8 to 14 carbon atoms and from 70 to 20 mol % of the structural unit derived from an aromatic dicarboxylic acid.

4. The resin composition according to claim 1, wherein, in the first polyamide resin, the structural unit derived from an α,ω-linear aliphatic dicarboxylic acid having from 8 to 14 carbon atoms comprises at least one of a structural unit derived from sebacic acid and a structural unit derived from dodecanedioic acid.

5. The resin composition according to claim 1, wherein, in the first polyamide resin, the structural unit derived from an aromatic dicarboxylic acid comprises at least one of a structural unit derived from 2,6-naphthalenedicarboxylic acid and a structural unit derived from isophthalic acid.

6. The resin composition according to claim 1, wherein,
    in the first polyamide resin, 90 mol % or more of the structural unit derived from a diamine is a structural unit derived from isophorone diamine,
    the structural unit derived from a dicarboxylic acid comprises from 30 to 80 mol % of a structural unit derived from an α,ω-linear aliphatic dicarboxylic acid having from 8 to 14 carbon atoms and from 70 to 20 mol % of a structural unit derived from an aromatic dicarboxylic acid,
    the structural unit derived from an α,ω-linear aliphatic dicarboxylic acid having 8 to 14 carbon atoms comprises at least one of a structural unit derived from sebacic acid and a structural unit derived from dodecanedioic acid, and
    the structural unit derived from an aromatic dicarboxylic acid comprises at least one of a structural unit derived from 2,6-naphthalenedicarboxylic acid and a structural unit derived from isophthalic acid.

7. The resin composition according to claim 6, wherein the second polyamide resin comprises a structural unit derived from a diamine and a structural unit derived from a dicarboxylic acid, and 50 mol % or more of the structural unit derived from a diamine is the structural unit comprising two or more alicyclic structures.

8. The resin composition according to claim 6, wherein the second polyamide resin comprises a structural unit derived from a diamine and a structural unit derived from a dicarboxylic acid, and wherein 70 mol % or more of the structural unit derived from a diamine is the structural unit comprising two or more alicyclic structures.

9. The resin composition according to claim 6, wherein a mass ratio of the second polyamide resin to the sum of the first polyamide resin and the second polyamide resin is from 20 to 80% by mass.

10. The resin composition according to claim 1, wherein the second polyamide resin comprises a structural unit derived from a diamine and a structural unit derived from a dicarboxylic acid, and 50 mol % or more of the structural unit derived from a diamine is the structural unit comprising two or more alicyclic structures.

11. The resin composition according to claim 10, wherein the second polyamide resin comprises a structural unit derived from a diamine and a structural unit derived from a dicarboxylic acid, and 50 mol % or more of the structural unit derived from a dicarboxylic acid is a structural unit derived from an aromatic dicarboxylic acid.

12. The resin composition according to claim 10, wherein the second polyamide resin comprises a structural unit derived from a diamine and a structural unit derived from a dicarboxylic acid, and 50 mol % or more of the structural unit derived from a dicarboxylic acid is a structural unit derived from an α,ω-linear aliphatic dicarboxylic acid having from 6 to 20 carbon atoms.

13. The resin composition according to claim 1, wherein the second polyamide resin comprises a structural unit derived from a diamine and a structural unit derived from a dicarboxylic acid, and wherein 70 mol % or more of the structural unit derived from a diamine is the structural unit comprising two or more alicyclic structures.

14. The resin composition according to claim 1, wherein the structural unit comprising two or more alicyclic structures included in the second polyamide resin is represented by Formula (1):

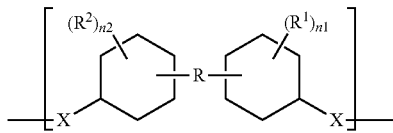

Formula (1)

where $R^1$ and $R^2$ each independently represent a hydrogen atom, or an alkyl group having from 1 to 4 carbon atoms, R is a single bond or a divalent linking group, Xs each are independently NH or CO, and n1 and n2 each are independently an integer from 1 to 6.

15. The resin composition according to claim 14, wherein a mass ratio of the second polyamide resin to the sum of the first polyamide resin and the second polyamide resin is from 20 to 80% by mass.

16. The resin composition according to claim 14, wherein a melt viscosity of the resin composition at 280° C., an apparent shear rate of 1216 sec$^{-1}$, and a holding time period of 6 minutes is 380 Pa·s or less.

17. The resin composition according to claim 1, wherein the structural unit comprising two or more alicyclic structures included in the second polyamide resin is represented by Formula (3):

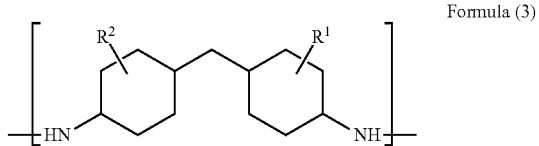

Formula (3)

where $R^1$ and $R^2$ each independently represent a hydrogen atom, or an alkyl group having from 1 to 4 carbon atoms.

18. The resin composition according to claim 1, wherein a mass ratio of the second polyamide resin to the sum of the first polyamide resin and the second polyamide resin is from 20 to 80% by mass.

19. The resin composition according to claim 1, wherein a melt viscosity of the resin composition at 280° C., an apparent shear rate of 1216 sec$^{-1}$, and a holding time period of 6 minutes is 380 Pa·s or less.

20. A molded article formed from the resin composition described in claim 1.

* * * * *